Oct. 18, 1949.  G. LOWKRANTZ ET AL  2,485,301
WIND DRIFT INSTRUMENT

Filed Aug. 8, 1941  5 Sheets-Sheet 1

GUNNE LOWKRANTZ
KARL A. KAIL
INVENTORS

BY Leech & Radue

ATTORNEYS

Oct. 18, 1949.  G. LOWKRANTZ ET AL  2,485,301
WIND DRIFT INSTRUMENT

Filed Aug. 8, 1941   5 Sheets-Sheet 5

GUNNE LOWKRANTZ
KARL A. KAIL
INVENTORS

BY  *Leech & Radue*

ATTORNEYS

Patented Oct. 18, 1949

2,485,301

UNITED STATES PATENT OFFICE 2,485,301

WIND DRIFT INSTRUMENT

Gunne Lowkrantz, Binghamton, N. Y., and Karl A. Kail, Montrose, Pa., assignors to Link Aviation, Inc., a corporation of New York Application August 8, 1941, Serial No. 406,056

16 Claims. (Cl. 35—10)

This invention relates to a wind drift instrument which finds specific application in combination with an aviation trainer of the grounded type. Edwin A. Link, Jr., Patents Nos. 1,825,462 and 2,099,857 may be referred to for a full and detailed disclosure of aviation trainers adapted for use in combination with the instrument now to be disclosed. Such aviation trainers include controls for causing rotation about a fixed vertical axis or universal movement with respect to a fixed pivot.

One of the principal fields of use for the Link aviation trainer is in the instruction of pilots in instrument or blind flying. Generally speaking, the basic purpose of the present invention is to increase the usefulness of the trainer in the instruction of students in such problems by adding a simulated wind effect. Fundamentally, the present wind drift instrument comprises a triangulating mechanism or equivalent means adapted to be interposed between the rotating trainer and the recorder which plots the performance of the trainer.

In aerial navigation, the direction in which an airplane is pointing is referred to as its "heading," and the term "course" is used to denote the desired "track" which is usually planned before flight. The latter expression "track," means the direction of the actual path over the ground covered by the airplane. These definitions are intended where the respective terms are used herein.

The function of the wind drift instrument will be better appreciated if one first understands generally the effect of wind on an airplane in actual flight. The airplane will be assumed to be in actual flight on a due north heading at an air speed of 200 miles per hour. If there is a complete absence of wind, the ground speed also will be 200 miles per hour, and the course traveled will be the same as the heading i. e. north. Next, let it be assumed that there is a due north, 50 mile-per-hour head wind. While this head wind will not affect the course, it will obviously reduce its ground speed to 150 miles per hour. If it should now be assumed that instead of a due north 50 mile-per-hour head wind, there is a due south tail wind of 50 miles per hour, the result is again, no change in course, but an increase in ground speed to 250 miles per hour.

On the other hand, if instead of a due north head or tail wind the wind has any other direction which is angular to the due north heading of the plane, it is obvious that there will be a corresponding modification of the ground speed of the plane and also of the course traveled, both being dependent upon the factors of wind speed and wind direction. The effects of such angular winds can be readily determined by simple triangulation formula. When the wind speed and direction are known, these factors taken with air speed and intended course permit ready computation of the so-called drift angle which the pilot must compensate for by changing the heading of his plane.

In order to simulate the wind conditions of actual flight in using the Link trainer, the wind drift instrument of this invention has been provided to solve mechanically and continuously the mathematical triangulation formula which is involved, and to show by means of its effect upon a recorder which is arranged to plot the trainer course whether or not a student has correctly solved the problem in flight.

Suitable means have been provided whereby the instructor who is without the trainer can, by simple settings or adjustments, cause the recorder to respond to a condition of ground speed and wind drift corresponding to pre-determined wind conditions, and which must be corrected by the student. The recorder shows clearly to what extent such correction has been made. In actual practice, the instructor may advise the student in advance that at a certain time in his flight he will encounter a wind of given speed and direction or, through means of the radio beam system by which the student is flying, the signals may be varied by the instructor in such a manner as to indicate to the student that a wind is blowing him off course.

A principal purpose of this invention is to provide a mechanism which through its intervention between the output of the rotating trainer and the recorder therefor, will modify the speed and direction of the latter over a fixed chart in accordance with a pre-selected wind condition. That is to say, the turning or direction and linear speed of the recorder may be affected by wind factors independently of the rotation of the trainer and the throttle setting thereof, as will be understood from the subsequent detail description of operation.

However, the principles of the present wind drift instrument are generally applicable to any problem in which it is desired to modify a combined two-direction rotational and linear input according to a pre-selected factor having direction as well as magnitude and obtain a resultant output which is constantly variable with change of either part of the input.

More specifically, it is intended to provide means under control of the instructor for introducing into the recorded output of the trainer, which is represented by "track" of the recorder, any desired wind direction and speed within practical limits.

In the embodiment to be described, the wind drift instrument comprises a wind direction slide member for guiding a reciprocable wind speed member, means for introducing into the mechanical wind triangulation the factor of throttle setting or air speed, and means including an assembly of gear trains for relating the wind factors and air speed factor to both the rotational input from the trainer, and the rotational output to the recorder.

Further novel features of construction contributing to the facility and accuracy of operation, and involving certain novel combinations of parts will be perceived and readily understood from the following detailed description of a preferred embodiment of the invention taken in connection with the accompanying drawings, in which Fig. 1 is a schematic illustration of the wind drift instrument in its assembled relation to a Link aviation trainer, radio beam transmitter, and recorder;

Figure 1:
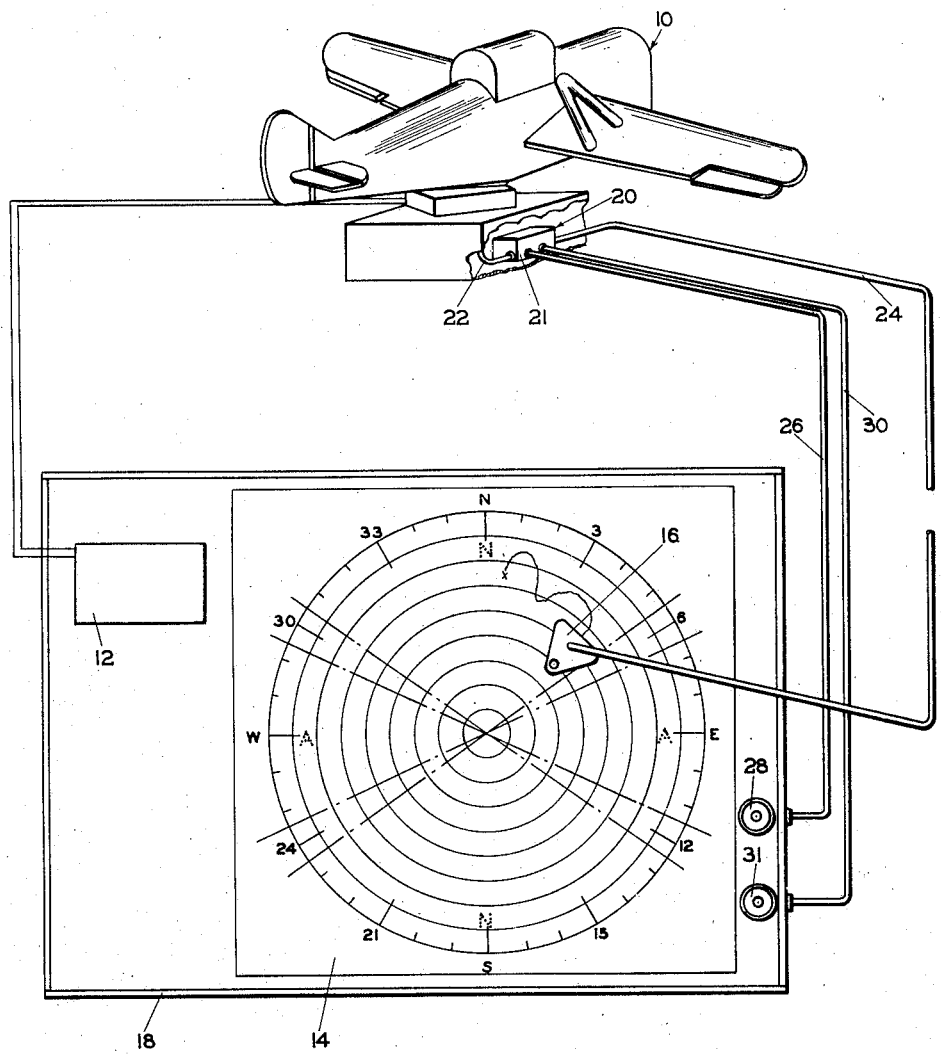

Referring to Fig. 1, the numeral 10 indicates generally a well-known Link aviation trainer, 12 denotes the likewise previously known radio apparatus for use with such a trainer, 14 is a chart for plotting the trainer course, and 16 is a recording instrument which traverses the chart. The radio device 12, chart 14, and recorder 16 are all arranged conveniently on an instructor's table or desk 18.

For full details of the radio apparatus and its relation to the trainer for purposes of blind flying instruction, reference is made to Edwin A. Link, Jr., Patent No. 2,119,083.

The details and operation of the recorder 16 are fully set forth in Edwin A. Link, Jr., Patent No. 2,179,663.

The base of the rotatable trainer 10 encloses a wind drift instrument designated generally as 20 and provided with a rectangular housing member 21. It will be further observed in Fig. 1 that trainer 10 includes a flexible output shaft 22 which is led into the wind drift instrument 20 and taken as output therefrom by means of a combined cable 24 of electrical leads running onto the recorder 16 on the instructor's desk 18. A flexible cable or shaft 26 extends from a knob 28 on the desk 18 to the wind drift instrument 20 in the base of the trainer, and is for the purpose of permitting the instructor to control and regulate the input of the factor wind speed to the apparatus. Similarly, a flexible cable or shaft 30 connects an instructor-controlled knob 31 with the wind drift instrument 20 so that the input of wind direction may be under the convenient control of the instructor.

Figure 3:
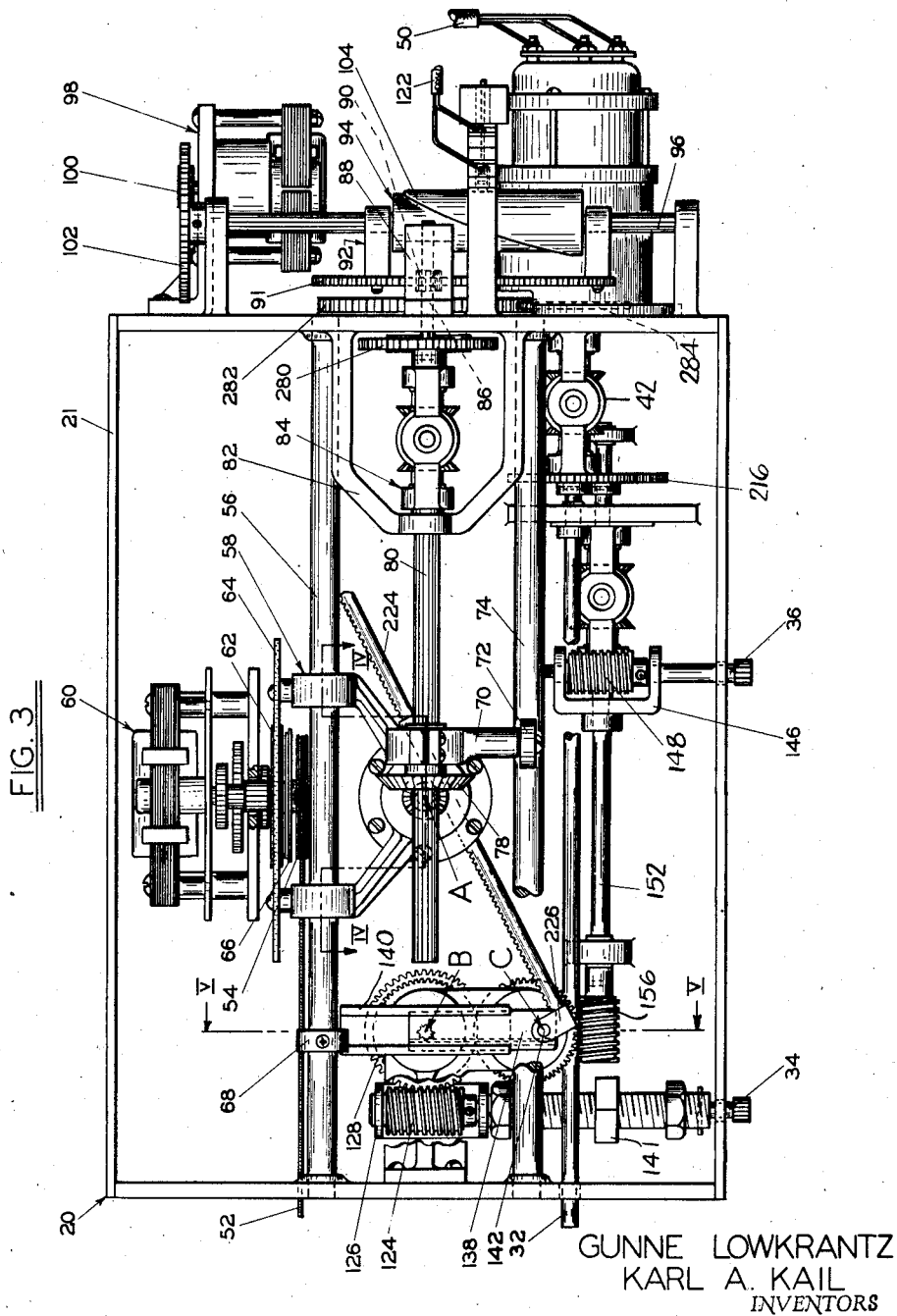
Fig. 3 is a top plan view showing further the arrangement of the mechanism of the wind drift instrument.

In Fig. 3, a horizontally extending shaft 32 projects from the housing 21 for connection with the trainer output shaft 22. The instructor-controlled wind speed and wind direction, flexible shafts 26 and 30, are joined respectively to transversely extending shafts 34 and 36 which also project from the housing 21 of the wind drift instrument.

Figure 2:
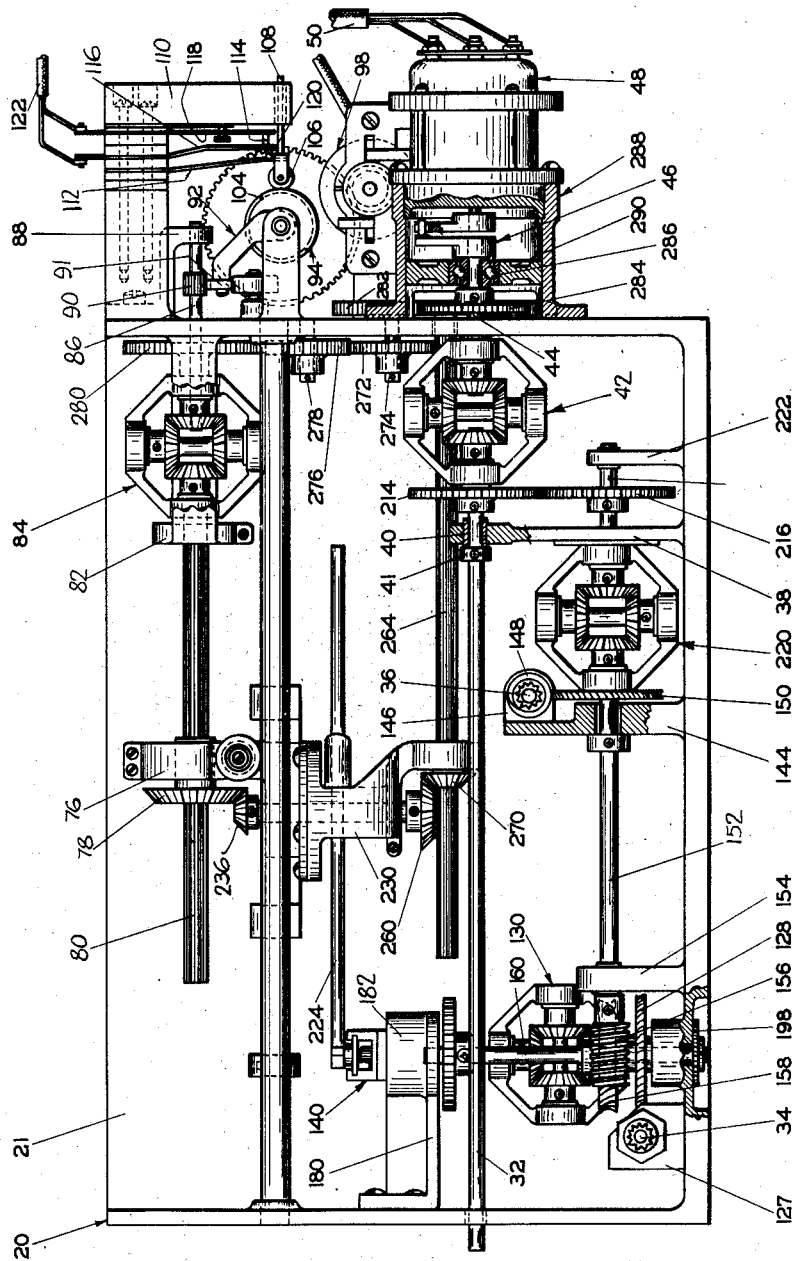
Fig. 2 is a vertical longitudinal elevation of the wind drift instrument itself, certain parts being shown in section.

Shaft 32 is received at its innermost end within an upright support 38 having a bearing bushing 40 against which abuts a stop collar 41 on said trainer output shaft 32 (Fig. 2). A conventional form of differential 42 is interposed between the inner end of shaft 32 and an aligned output shaft 44 extending without the housing 21 and having a separable crank and pin connection 46 with an "autosyn" motor 48 connected by an electric cable 50 to the recorder 16.

The means for imparting a factor representative of throttle setting or air speed to the wind drift instrument 20 will now be pointed out with respect to Fig. 3. From the left side of this figure a flexible wire cable connection 52 extending from the throttle within the trainer 10 is led to a take-up pulley 54 within the housing 21 of the wind drift instrument. This take-up pulley 54 is spring-biased in one direction and rotates about a fixed axis transverse of and adjacent a slide bar or track 56 on which an air speed slide 58 is reciprocable longitudinally of the wind drift instrument 20. A conventional two-way, follow-up motor 60 is provided for setting air speed slide 58 and is operable through means of a pinion 62 driving a rack 64 fixed to said slide. The direction and length of time the follow-up motor 60 runs are controlled by a rotary switch 66, of conventional type, attached to the spring-biased pulley 54 which is rotated by the air speed cable 52. While it is not considered necessary to go into the full details of the rotary switch 66, it is noted that it comprises two plate sections attached to the pinion 62. Contacting each plate section (one for clockwise, the other for counter-clockwise rotation of the motor 60) is a brush which carries one side of the circuit to said follow-up motor 60. The periphery of each such plate is cut away and arranged to prevent running the pinion 62 beyond the limits of rack 64. When the pulley 54 rotates due to a change in air speed, contact is made with one of the plates rotating with pinion 62, and this completes the circuit to the follow-up motor 60, which then causes the pinion 62 to rotate and drives the rack 64 until a gap between the contact plates is reached, at which time the motor 60 stops.

Note is next taken that the left end of the slide bar or track 56 is provided with a stop collar 68 which can be adjusted to the zero speed position of air speed slide 58—Fig. 3 showing that slide in its intermediate position.

The air speed slide 58 includes also a horizontal arm 70 carrying at its outer end a roller 72 bearing on the upper side of a fixed longitudinal supporting track 74. A split, upstanding bearing member 76 is secured to air speed slide 58 for movement therewith and receives a vertically arranged bevel gear 78 sliding over a horizontal, splined shaft 80 which is rotated in opposite directions by means to be described.

In Fig. 3, A designates a vertical axis located by the position of air speed slide 58 and always lying along the longitudinal axis of splined shaft 80 and in a plane passing through the axis of slide-driving pinion 62, and offset from the smaller end of bevel gear 78. The axis A establishes one apex of the wind triangle which will be more fully discussed as the description of the instrument proceeds.

The right end of the splined shaft 80 which rotates in response to movement of the beveled gear 78 is supported by a generally rectangular bracket 82 projecting horizontally from and within the housing 21. An additional differential 84 is secured to the shaft 80 within the bracket 82 and has an aligned output shaft 86 which is rotatably supported outside of the housing 21 by a depending bracket 88 (Fig. 2). There is a pinion 90 rotating with the shaft 86 and outside of the housing 21 for driving an underlying rack 91 carried by a carriage 92 abutting opposite ends of a cylindrical timing cam 94, and adapted to shift it along a horizontally supported splined shaft 96 constantly rotated in one direction by an electric motor 98 through the medium of reduction gears 100 and 102.

The cylindrical timing cam 94 is provided with a raised portion 104 of the extent and shape indicated in Fig. 3. This extent and shape are such that there is a band portion at the upper end which has no raised segment, and the raised cam portion 104 starting at that point progressively encircles the cylindrical timing cam 94 until it completely surrounds the same at its lower end.

A roller cam follower 106, which is carried on the end of a rod 108 is reciprocably supported in a depending bracket arm 110, normally engages the cylindrical cam 94 (Fig. 2). A leaf spring 112 is connected to the bracket arm 110 and arranged constantly to urge the roller cam follower 106 against the cam 94 so that a pair of switch points 114 will be maintained in contact when the cam follower 106 engages any part of the raised portion 104. A depending pair of spring-strip leads 116 and 118, the latter of which is adjustable in tension, carry the switch points 114. The innermost strip lead 116 stops against an abutment 120 on the lower end of leaf spring 112 when the circuit is closed. A two-conductor electric cable 122 extends to the driving wheels of the recorder 16 in order to propel it at a uniform speed as long as cam follower 106 is on any part of the raised portion 104 of cylindrical timing cam 94. The electric cables 50 and 122, both leading to the recorder 16, are in practice joined into the single cable 24 illustrated in Fig. 1. The cam means which have been outlined provide for either no advance movement of the recorder 16, or for continuous advance without interruption, and permit an intermediate graduation of speed corresponding to the arc covered by the raised portion 104 at the point of contact with the follower 106. From what has been described previously, it will be appreciated that the linear speed of the recorder 16 will be at all times proportional to the throttle setting or simulated air speed of the trainer.

A second apex of the wind triangle mechanism is indicated by B in Fig. 3, and locates a vertical axis which constitutes the only fixed reference point of the wind triangle.

The shaft 34, which is connected to the instructor controlled wind speed knob 28 by means of flexible shaft 26, extends transversely of the housing 21 (Fig. 3) and has at its inner end an attached worm 124 suitably supported for rotation, as in an upstanding bracket 126, and meshing with a horizontal worm gear 128. Through a differential 130 (Figs. 2 and 5) the worm gear 128 rotates a vertical spindle 132 about an axis coincident with the wind triangle apex point B, the differential 130 being supported on an upstanding boss 134 of substantial height which is preferably integral with the housing 21. Further details of the support of the differential 130 will be given subsequently.

At its upper end, the vertical spindle 132 carries a pinion 136 arranged in driving relation with a wind speed rack 138 reciprocable in a wind direction slide block 140. To prevent disengagement of the pinion 136 (Fig. 5) from the wind speed rack 138, the rotation of shaft 34 is limited by a sliding nut 141 running on the threaded middle portion of said shaft 24, as illustrated by Fig. 3. The wind speed rack 138 has at its outer end a vertical pivot pin 142, the axis of which corresponds to a third apex C of the wind triangle (Fig. 3). Accordingly, the distance between apexes B and C represents wind speed as cranked into the instrument by the instructor.

Figure 5:
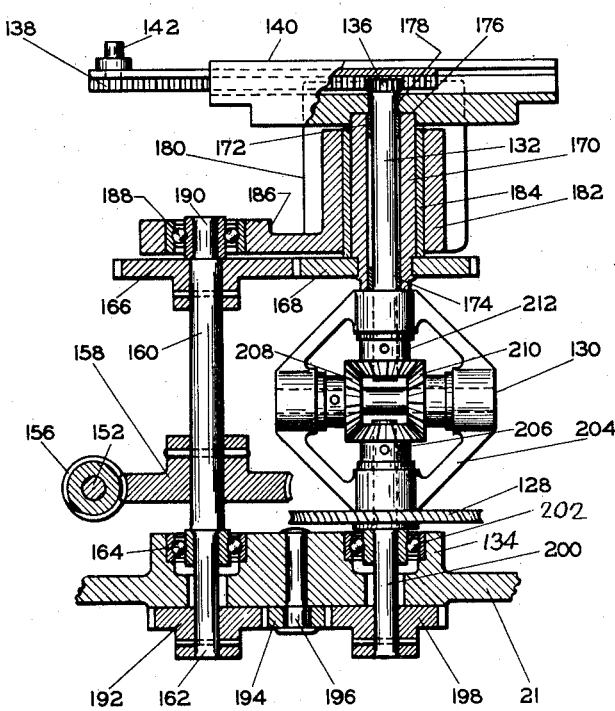
Fig. 5 shows by way of an enlarged vertical section taken on line V—V of Fig. 3 certain details of the wind direction slide and wind speed member.

The manner of rotating wind direction slide block 140 according to instructor-selected wind direction, will now be described. This element of wind velocity is imparted to the wind drift instrument 20 through shaft 36 connected by flexible shaft 30 to the wind direction knob 31 on the instructor's table 18. It will be observed that the shaft 36 extends transversely of the housing 21 and has its inner end supported by an upstanding bracket 144 provided with a horizontal U-shaped extension 146 at its upper end and receiving a worm 148 meshing with an underlying worm gear 150 connected in driving relation to a longitudinally extending horizontal shaft 152 which passes through bracket 144. At its left end as seen in Fig. 2, the shaft 152 extends through another supporting bracket 154, and thence to a worm 156 arranged in driving relation to a horizontal worm gear 158 which is pinned to a vertical countershaft 160 (Fig. 5). The countershaft 160 has a lower stepped end 162 which is supported by ball bearings 164 in the boss 134 for rotation about an axis parallel to the vertical spindle 132 which drives the wind speed rack 138. Adjacent its upper end, the countershaft 160 carries a spur gear 166 meshing with a similar spur gear 168 of the same size and rigidly secured on a hollow shaft 170 surrounding and concentric with spindle 132. Upper and lower spacer bushings 172 and 174 maintain the spaced relation of spindle 132 and hollow shaft 170.

The underside of wind direction slide block 140 is formed with a countersunk portion 176 which is keyed onto the upper end of shaft 170 so as to rotate said wind direction block. Note is also taken of a bored continuation 178 of countersunk portion 176 for loosely passing the upper end of spindle 132.

A bracket 180 extending horizontally from the left end of housing 21 carries an integral vertical sleeve 182 fitted with a bushing 184 for maintaining the vertical position of hollow shaft 170. A shorter and parallel sleeve 186 of the bracket 180 is fitted with ball bearings 188 to rotatably support a stepped upper end 190 of the countershaft 160.

If it were not for the differential 130, rotation of the wind direction slide block 140 would cause the wind speed rack 138 which turns therewith to move in said block by reason of its constant engagement with pinion 136. This objectionable motion, which would otherwise be reflected in the output of the wind drift instrument to the recorder 16, is taken out of the wind drift instrument by the following means. With further reference to Fig. 5, it will be seen that the countershaft 160 has affixed to its lower end below boss 134, a spur gear 192 meshing with a small reversing gear 194 rotatably mounted on a headed pin or stub shaft 196 secured to said bossing 134. A second spur gear 198 of the same size as gear 192 meshes with the other side of reversing gear 194 and drives a vertical shaft 200 which extends below boss 134 and is supported by a ball bearing 202 carried in the upper portion of said boss. Shaft 200 and worm gear 128 are both connected to a frame 204 of the differential 130. This differential 130 which is similar to the other differentials embodied in the present instrument, includes a bevel gear 206 cooperating in the usual way with an opposed pair of differential gears 208 and 210, and through them driving an opposite aligned bevel gear 212 turning with vertical spindle 132 and pinion 136, which drives the wind speed rack 138.

Reverting to Fig. 2, the rotation of shaft 32 in response to change of trainer heading similarly turns a spur gear 214 which is fastened to said shaft between support 38 and differential 42, the spur gear 214 being in mesh with another spur gear 216 of like size mounted on a short shaft 218 in coaxial alignment with horizontal shaft 152. The shaft 218 is connected to shaft 152 through a further differential 220 similar to the one which has been described in detail. Adjacent differential 220 the shaft 218 is rotatably carried by the support 38 through which it extends and is similarly supported at its free right end by an upstanding bracket 222.

Through the means just disclosed, the wind direction slide block 140 is given a rotation which is the resultant of that imparted by the trainer controlled shaft 32 and the manually controlled wind direction shaft 36.

Returning to the wind speed rack 138, attention is now directed to a wind triangle rack 224 pivoted at one end on the vertical pin 142 of slide block 140 by a rigid, lateral offsetting arm 226. In this connection it is noted that the offsetting arm 226 has the same effective length as the constant offset of wind triangle rack 224 from apex point A.

Figure 4:
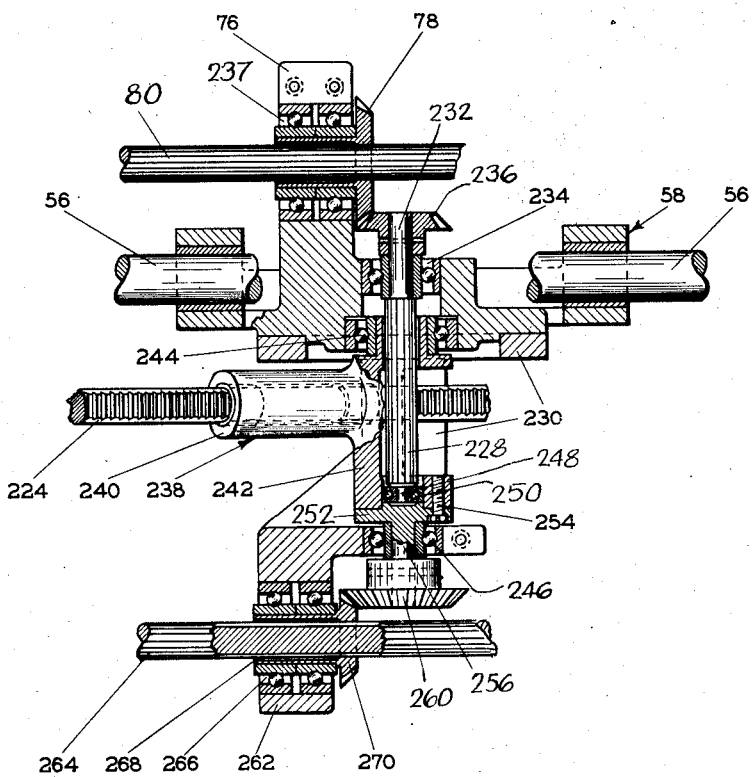
Fig. 4 is an enlarged vertical section taken on line IV—IV of Fig. 3.

In the detailed enlargement of Fig. 4, the relation of the wind triangle rack 224 to the vertical axis through apex point A is clearly shown. A pinion-toothed shaft 228 is arranged vertically for engagement with the wind triangle rack 224, the shaft 228 being carried by a central depending portion 230 of the air speed slide 58. The untoothed upper end 232 of pinion shaft 228 extends through bearings 234 and is attached to a bevel gear 236 meshing with the bevel gear 78, having its shank supported by bearings 237 within the split support 76, said gear 78 turning the horizontal splined shaft 80. The wind triangle rack 224 is further supported at its extending end adjacent point A by a wind triangle pivot member 238 having a horizontal tubular portion 240 in which said rack slides freely and a vertical generally cylindrical portion 242 with which said rack rotates. At its upper and lower ends the wind triangle pivot member 238 is rotatably supported in bearings 244 and 246, respectively. The pinion shaft 228 passes freely through the wind triangle pivot member 238 and is formed with a reduced lower end 248 for rotation in bearing 250 retained by a cover member 252 which is in turn attached to pivot member 238 by vertically extending screws 254, only one of which is shown. Cover member 252 includes a depending shaft extension 256 passing through bearings 246 in the depending portion 230 of air speed slide 58 and is secured to a bevel gear 260 at its lower projecting end. A longitudinally offset depending portion 262 of the central depending portion 230 loosely encircles a longitudinally extending, toothed shaft 264 which it supports through the medium of bearings 266 in which turns a hollow shank 268 of a bevel gear 270 which is keyed to shaft 264 for reciprocation on and turning with in response to rotation of the other meshing bevel gear 260.

Fig. 2 indicates the manner in which the toothed shaft 264 extends freely through housing 21 and is supported thereby at its right end. A spur gear 272 engages the upper portion of toothed shaft 264 within the right end of the housing 21 and is keyed to a short shaft 274 extending through said housing. In vertical alignment with the spur gear 272 is a reversing idler gear 276 rotating freely on a stub shaft 278 projecting inwardly of the housing, and a spur gear 280 meshing with the reversing gear 276 and secured to the output shaft 86 of the differential 84. The end of shaft 264 which is outside of the housing 21 carries a spur gear 282 meshing with a smaller spur gear 284 which is laterally adjacent and secured to the output shaft 44 of differential 42, the shaft 44 being further supported by a bearing 286 mounted within a cylindrical support 288 and centrally of a supporting disc 290. As observed near the beginning of the specification, the output shaft 44 has a separable connection 46 with the "autosyn" 48 which controls the turning movement of the recorder 16.

For the purpose of removing backlash in the mechanism, a constant-speed motor (not shown) may be geared in at gear 284 (Fig. 2).

Definition of terms

Before proceeding with a statement of the complete operation of the wind drift instrument of this invention, it will be well to reconsider and amplify some of the essential terms previously defined specifically or by implication.

The term "heading" as used herein is intended to mean the angular direction assumed by the trainer 10, that is, the way in which it is caused to point by the student operating its controls.

Provision is made within the trainer for a compensation of "air speed" due to the attitude of the trainer, namely, climbing flight at a constant altitude, or diving. Only when there is neither diving nor climbing are air speed and throttle setting synonymous. In every instance, "air speed" refers to the speed or assumed speed relative to the air surrounding the plane.

The path of the recorder 16 over the chart 14, which has fixed relative orientation with respect to the trainer 10, is known as "track," and represents the extent and direction of travel over the ground. Another way of explaining track is to say that it represents the course actually made good in flight.

"Ground speed" is to be carefully distinguished from "air speed" in that the former expression pertains to the speed of the plane relative to the ground or fixed terrain.

Figure 6:
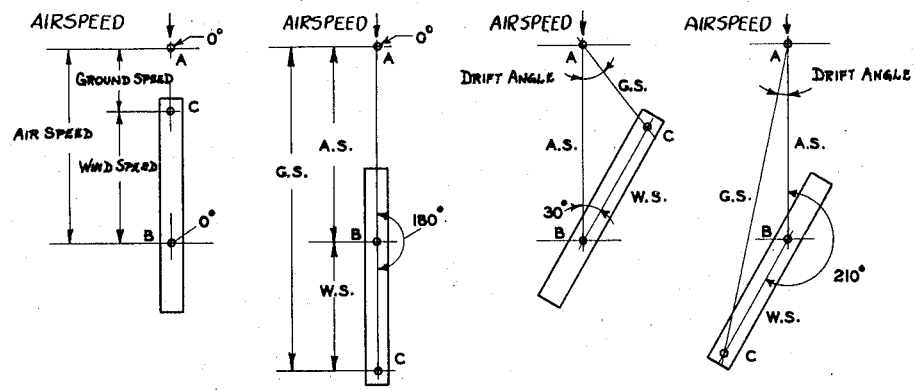
Fig. 6 is a diagrammatic representation of the response of the wind drift mechanism to certain simulated conditions.

Diagrams of Fig. 6

A good idea of the basic function of the wind drift instrument can be obtained from a consideration of the different conditions represented by the four vector diagrams of Fig. 6, in each of which the designation of the wind triangle apexes as A, B, C corresponds to that previously indicated on the mechanism shown in Fig. 3. For relative orientation, the wind may be represented by the side BC and moving in the direction from B to C. Air speed is represented by the side AB and in the direction A to B. The triangle side BC is oriented relative to side AB according to the heading of the aircraft relative to the wind. Angle ABC is the angle which the heading of the aircraft makes with the wind, or the relative wind angle. Since the direction of the side AB is fixed, the relative wind angle ABC is varied by rotating the wind direction slide block 140 or side BC. When the heading of the trainer is changed, the side BC or wind direction block 140 rotates in the same direction. However, when the wind direction is altered, the wind direction slide block 140 or side BC rotates in the opposite direction to the shifting of the wind. These two movements of rotation are applied simultaneously to the wind direction slide block 140.

When the wind speed is zero or when the wind is blowing along the line of direction of the trainer heading, the wind direction slide block 140 or side BC will have the same angular position as the trainer heading. In the case of the extreme left diagram of Fig. 6, the condition represented is that of a head wind of the relative magnitude indicated by "Wind speed" which has the effect of producing a ground speed equal to the air speed minus the wind speed. The relative wind angle is zero. Proceeding to the right, the condition represented is one of a tail wind having the same speed as in the first example but obviously producing a ground speed which is the sum of the air speed and wind speed. The relative wind angle is 180 degrees, as shown.

In the diagrams, the side including the apexes B and C corresponds to the wind direction slide block 140 and shows its relative position with respect to the fixed apex B. Obviously, if there were no wind, the apexes B and C would coincide, and when there is a tail wind, the side BC rotates through an angle of 180 degrees from the position shown in the first diagram which represents a head wind to the position shown in the second diagram.

In the third diagram from the left, the relative wind angle ABC has changed from zero to 30 degrees, as shown by the position of the side BC. This change can take place through either a change in trainer heading or wind direction.

The fourth diagram on the extreme right shows a relative wind angle of 210 degrees with the combined trainer heading and wind direction exactly opposite that in the third diagram.

In each of the diagrams the wind speed and air speed are of the same magnitude, respectively. As noted, the second and fourth diagrams reading from the left show opposite relative wind directions with respect to trainer heading from the first and third diagrams, respectively. In each case represented, the resultant ground speed is clearly indicated by the side AC, and the drift angle by the angle CAB.

*Summary of operation*

Heading is led into the wind drift instrument 20 from the flexible shaft 22 suitably connected to trainer 10 and rotating, through shaft 32, meshed spur gears 214 and 216 (Fig. 2). Wind direction as controlled by the instrument knob 31 is introduced through shaft 36 to worm 148 and worm gear 150. The outputs from both of these sources are applied to the differential 220 and the resultant is transmitted to the wind direction slide block 140 through horizontal shaft 152, gears 156, 158, shaft 160, gears 166, 168, and hollow shaft 170.

As the wind direction slide block 140 or triangle side BC rotates, the rack 224 or triangle side AC gives the drift angle by its pivoting movement at the apex A (Fig. 3). Figs. 2 and 4 show the same parts in side view and disclose the manner in which the two distinct drives are taken off the wind triangle rack 224 through pinion shaft 228 and its attached bevel gears 236 and 260, respectively.

Track is one required output of the wind drift mechanism. Since the pivoting movement of rack 224 at wind triangle apex A gives the drift angle, in order to obtain track, it is necessary to add the heading to the drift algebraically. This is done at the so-called track differential 42. The drift angle is taken from the wind triangle pivot member 238 at A and the heading from the shaft 32. These two movements are led into the differential 42 and coordinated to give the required output of track.

The stages of movement by which the track is obtained will now be described. The heading component is continuously received from the trainer 10 through shaft 32 connected directly to one side of the track differential 42.

At the same time, the wind drift component is received through mechanical means comprising bevel gear 260 secured to the wind triangle pivot member 238, companion bevel gear 270, and spur gear 272 which takes its drive directly from the toothed shaft 264. Through gears 282 and 284, the shaft 264 drives also the secondary side of the track differential 42.

The output shaft 44 of the track differential 42 drives the "autosyn" 48 which governs its dependent motor in the recorder 16 to control the direction of travel thereof.

As was seen from the previous consideration of the wind triangle, ground speed is given by the sliding movement of the wind triangle rack 224 through the tubular portion 240 of the wind pivot member 238. Sliding movement of rack 224 in tubular portion 240 rotates pinion shaft 228, gears 236 and 78, and the splined shaft 80. This sliding movement occurs as a result of movement of the pivots A or C. A consideration of Fig. 4 will demonstrate the impossibility of taking off from the bevel gear 236 at apex A the sliding motion alone; and when sliding motion is imparted, the wind triangle rack 224 under certain conditions not only slides but pivots, giving an additional rotation to the pinion bevel gear 236, which rotational movement is equal to change in drift angle. Therefore, to obtain ground speed alone, the drift must be removed. This is done by means of the differential 84 which may properly be termed wind drift subtraction differential. Into the left side of the differential 84 as viewed in Fig. 2, is led the combined pivoting and sliding movement of the wind triangle rack 224 through the medium of splined shaft 80. Into the other side of this differential 84 is led the pivoting motion alone, through bevel gears 260, 270, toothed shaft 264, and meshing gears 272 and 276 driving gear 280 on shaft 86. This latter drive works in opposition to the drive from the wind triangle rack 224. Thus it follows, the output of the differential 84 is the sliding plus the pivoting motion minus the pivoting motion, which equals the sliding movement alone, or ground speed.

The output of the wind drift subtraction differential 84 is imparted to pinion 90 which varies the position of cylindrical cam 94 and controls the speed of the recorder 16 over the chart 14 in the manner fully described hitherto.

The air speed component of the wind triangle ABC is varied by altering the distance between the pivot apex A and the fixed pivot B. It will be recalled that the wind triangle pivot member 238 is mounted on the air speed slide 58 and is free to move towards or away from the apex B on wind direction slide block 140, by reason of the fact that the bevel gears 78 and 270 are free to slide on their respectively keyed shafts 80 and 264.

The position of the wind triangle, pivot apex A and the air speed slide 58, is controlled by the two-way follow-up motor 60 which acts through pinion 62 and rack 64, the rack being secured to the slide 58. In an earlier part of the specification, the function and detailed operation of the follow-up motor 60 have been adequately described. Likewise, it will be remembered that the operation of this motor 60 is controlled by the cable 52 leading from the throttle (not shown) within trainer 10.

The manner of varying the wind speed factor by altering the distance between apexes B and C has been set forth. The principal means for this purpose are the wind direction slide block 140 and rack 138 which it accommodates. The rack 138, as shown in Fig. 5, is driven by a pinion 136 to whatever extent is required for decreasing or increasing the wind speed by moving the vertical pivot pin 142 toward or away from the apex B.

If the drive to the rack 138 were a direct one, the setting of the pivot or crank pin 142 would be disturbed whenever the wind direction slide block 140 turned, because the pinion 136 would remain stationary and the rack 138 rotating about it would cause the pinion to drive the rack. To allow for the fact that the wind direction slide block 140 must revolve as the trainer heading changes, the differential 130 has been provided. It is the function of the wind speed differential 130 to turn the pinion 136 in the same direction as that in which the wind block 140 is revolving. From Fig. 5, it can be seen that when the wind block 140 rotates, its movement will be transmitted through gears 168, 166, 192, and the primary drive of the differential 130 to the pinion at 136, the drive being reversed at gear 195.

With the wind speed differential 130, the turning movement of the trainer 10 is nullified so far as any effect on the pivot or crank pin 142 is concerned. As previously pointed out, the wind speed rack 138 is slidably set by the instructor through worm 156 and worm gear 158 acting through the secondary drive of the differential 130 to the pinion 136 at apex B. When the pivot or crank pin 142 on rack 138 coincides with apex B, the wind speed will be zero; and the present mechanism is constructed and arranged to permit the introduction of wind speed up to one-half the normal cruising speed of the trainer.

Although only the preferred form of the invention has been illustrated and described in detail, it will be apparent that various modifications and changes can be made in the application of the broadly novel principles which will fall within the spirit and scope thereof. It is not intended, therefore, that the invention be limited other than by the appended claims.

Having thus described the invention, what is claimed as new and desired to be secured by Letters Patent of the United States is:

1. An aviation training apparatus comprising, in combination, a grounded trainer rotatable about a vertical axis, a recorder connected to said trainer and adapted for movement with respect to a fixed surface in response to rotation of said trainer, and mechanical triangulating means intermediate the said trainer and the said recorder for modifying the responsive movement of the recorder with respect to the fixed surface in a predetermined manner to simulate the effect of wind on an aircraft in flight.

2. An aviation training apparatus comprising, in combination, a grounded trainer rotatable about a vertical axis, a recorder electrically connected to said trainer for movement with respect to a fixed surface in response to rotation of said trainer, and mechanical triangulating means intermediate the said trainer and the said recorder for modifying the responsive movement of the recorder relative to the fixed surface in a preselected and variable manner to simulate the effect of wind on an airplane in flight.

3. An aviation training apparatus comprising, in combination, a grounded trainer rotatable about a vertical axis and having throttle means for controlling simulated motor speed, a recorder connected to said trainer and its throttle means and adapted for movement with respect to a fixed surface in response to rotation of said trainer and at a linear speed controlled by the setting of the throttle means, and mechanical triangulating means intermediate the said trainer and the said recorder for modifying the responsive movement of the recorder with respect to the fixed surface in a predetermined manner to simulate the effect of wind on an aircraft in flight.

4. An aviation training apparatus comprising, in combination, a grounded trainer rotatable about a vertical axis and having throttle means for varying simulated motor speed, a recorder connected to said trainer and adapted for linear and rotational movement with respect to a reference surface in response to rotation of said trainer and variation in setting of the throttle means, and mechanical triangulating means between the said trainer and the said recorder for modifying the "track" of the recorder over the reference surface in a predetermined manner to simulate the effect of wind on an aircraft in flight.

5. An aviation training apparatus comprising, in combination, a grounded trainer rotatable about a vertical axis and having controls for causing rotation about said vertical axis and throttle means for controlling simulated motor speed, a recorder connected to said trainer and its throttle means and adapted for movement relative to a fixed surface in response to rotation of said trainer at a linear speed proportional to an assumed air speed of said trainer and directionally controlled thereby, and mechanical triangulating means for altering the relative motion between said recorder and said fixed surface in a direction and proportional to the speed of a wind assumed to be acting on said trainer during its simulated flight.

6. An aviation training apparatus comprising, in combination, a grounded trainer rotatable about a vertical axis and having controls for causing rotation about said vertical axis and throttle means for controlling simulated motor speed, a recorder connected to said trainer and its throttle means and adapted for movement relative to a fixed surface in response to rotation of said trainer at a linear speed proportional to an assumed air speed of said trainer and directionally controlled thereby, mechanical triangulating means for altering the relative motion between said recorder and said fixed surface in a direction and proportional to the speed of a wind assumed to be acting on said trainer during its simulated flight, and manually operable means extending from said mechanical triangulating means and arranged for operation by an instructor without the trainer to control the assumed wind speed and direction.

7. In a wind drift instrument, an input shaft rotatable in either direction; an output shaft responsive to rotation of the input shaft; and a triangulating mechanism interposed between said input and output shafts, said triangulating mechanism including sliding means manually settable with respect to a fixed reference point to correspond to a simulated condition of air speed, a member manually rotatable about a fixed axis to an angular position representing a selected wind direction, a slide member rotatable with said wind direction member and manually settable with respect to said fixed axis of rotation to correspond to a selected wind speed, and means automatically variable in length and angular position in response to the rotational position of said input shaft, the magnitude of the air speed setting and the magnitude and direction of the wind setting to represent instantaneous values of the resultant ground speed and direction.

8. In a wind drift instrument, an input shaft rotatable in either direction; an output shaft responsive to rotation of the input shaft; and a triangulating mechanism interposed between said input and output shafts, said triangulating mechanism including sliding means manually settable with respect to a fixed reference point to correspond to a simulated condition of air speed, a cylindrical cam having a raised portion varying in peripheral extent longitudinally of said cam, a follower arranged for cooperation with said cam for controlling the operating cycle of an electric motor, means connecting the sliding means and said follower to shift said follower lengthwise of said cam upon movement of said sliding means, a member manually rotatable about a fixed axis to an angular position representing a selected wind direction, a slide member rotatable with said wind direction member and manually settable with respect to said fixed axis of rotation to correspond to a selected wind speed, and means automatically variable in length and angular position in response to the rotational position of said input shaft, the magnitude of the air speed setting and the magnitude and direction of the wind setting to represent instantaneous values of the resultant ground speed and direction.

9. In a wind drift instrument, an input member rotatable in either direction about a fixed axis; an output member rotatable about a fixed axis and responsive to rotation of the input member; and a triangulating mechanism interposed between said input and output members, said triangulating mechanism including means manually settable with respect to distance from a fixed reference point to correspond to a simulated condition of air speed, a member manually rotatable about a fixed axis to an angular position representing a selected wind direction, a companion member rotatable with said wind direction member and manually settable with respect to the fixed axis of rotation of the manually rotatable member to correspond to a selected wind speed, and means automatically variable in length and angular position in response to the rotational position of said input member and the magnitude of the air speed setting and the magnitude and direction of the wind setting to represent instantaneous values of the resultant ground speed and direction.

10. In a wind drift instrument, an input shaft rotatable in two directions; a first differential mechanism connected by one side to said input shaft; an output shaft connected to the other side of said first differential mechanism; a wind direction shaft geared to said input shaft; a second differential mechanism inserted in said wind direction shaft; manually operable means connected to said wind direction shaft on the opposite end of said second differential mechanism from that which is geared to said input shaft for producing rotation thereof; a wind direction block mounted for rotation about a fixed axis; means geared to the wind direction shaft for rotating said wind direction block; a wind speed rack reciprocable in said wind direction block; a wind speed shaft extending transversely with respect to said wind speed rack; a pinion on the said wind speed shaft for driving said wind speed rack; a third differential mechanism inserted in said wind speed shaft; manually operable means connected to said wind speed shaft on the opposite end of said third differential mechanism from that carrying said pinion for producing rotation thereof; reversing gears connecting the means for rotating the wind direction slide block and said wind speed shaft positioned on the same side of the said third differential mechanism as the manually operable means therefor; a slide movable linearly from and toward the fixed axis of the said wind direction block; manually controlled means for moving said slide to a desired position; a pivot member mounted for free rotation on said slide; a wind triangle rack pivotally connected by one end to the extendible end of the said wind speed rack and slidable through a portion of the said pivot member; a variable speed output device for producing a resultant ground speed motion proportional to the setting of said manually movable slide and the relative magnitudes and angular positions of the wind speed rack and wind triangle rack; gearing means for transmitting the related motions of said linearly movable slide, said rotatable pivot member, and the sliding component of said wind triangle rack to the said variable speed output device; and additional gearing means transmitting changes in angular position of the wind triangle rack to the output shaft side of the first differential mechanism.

11. In a wind drift instrument, an input shaft rotatable in two direction; a first different mechanism connected by one side to said input shaft; an output shaft connected to the other side of said first differential mechanism; a wind direction shaft geared to said input shaft; a second differential mechanism inserted in said wind direction shaft; manually operable means connected to said wind direction shaft on the opposite end of said second differential mechanism from that which is geared to said input shaft for producing rotation thereof; a wind direction block mounted for rotation about a fixed axis; means geared to the wind direction shaft for rotating said wind direction block; a wind speed rack reciprocable in said wind direction block; a wind speed shaft extending transversely with respect to said wind speed rack, a pinion on the said wind speed shaft for driving said wind speed rack; a third differential mechanism inserted in said wind speed shaft; manually operable means connected to said wind speed shaft on the opposite end of said third differential mechanism from that carrying said pinion for producing rotation thereof; reversing gears connecting the means for rotating the wind direction slide block and said wind speed shaft positioned on the same side of the said third differential mechanism as the manually operable means therefor; a slide movable linearly from and toward the fixed axis of the said wind direction block; manually controlled means for moving said slide to a desired position; a pivot member mounted for free rotation on said slide; a wind triangle rack pivotally connected to the said wind speed rack and slidable through a portion of the said pivot member; a variable speed output device for producing a resultant ground speed motion proportional to the setting of said manually movable slide and the relative magnitudes and angular positions of the wind speed rack and wind triangle rack; means including a fourth differential mechanism having its opposite driving sides operatively connected to means responsive to the sliding and turning movement, and the turning movement, respectively, of the wind triangle rack for transmitting the related motions of said linearly movable slide, said rotatable pivot member, and the sliding component of said wind triangle rack to the said variable speed output device; and means for gearing the turning movement of the wind triangle rack to the output shaft side of the first differential.

12. In a wind drift instrument, an input shaft rotatable in two directions; a first differential mechanism connected by one side to said input shaft; an output shaft connected to the other side of said first differential mechanism; an "autosyn" motor connected to the free end of said output shaft; a wind direction shaft geared to said input shaft; a second differential mechanism inserted in said wind direction shaft; manually operable means connected to said wind direction shaft on the opposite end of said second differential mechanism from that which is geared to said input shaft for producing rotation thereof; a wind direction block mounted for rotation about a fixed axis; means geared to the wind direction shaft for rotating said wind direction block; a wind speed rack reciprocable in said wind direction block; a wind speed shaft extending transversely with respect to said wind speed rack; a pinion on the said wind speed shaft for driving said wind speed rack; a third differential mechanism inserted in said wind speed shaft; manually operable means connected to said wind speed shaft on the opposite end of said third differential mechanism from that carrying said pinion for producing rotation thereof; reversing gears connecting the means for rotating the wind direction slide block and said wind speed shaft positioned on the same side of the said third differential mechanism as the manually operable means therefor; a slide movable linearly from and toward the fixed axis of the said wind direction block; manually controlled means for moving said slide to a desired position; a pivot member mounted for free rotation on said slide; a wind triangle rack pivotally connected to one end of the said wind speed rack and slidable through a portion of the said pivot member; a variable speed output device including a cylindrical cam rotated at constant speed, a follower for said cam, and an electric circuit controlled by said follower for producing a resultant ground speed motion proportional to the setting of said manually movable slide and the relative magnitudes and angular positions of the wind speed rack and wind triangle rack; gearing means for transmitting the related motions of said linearly movable slide, said rotatable pivot member, and the sliding component of said wind triangle rack to the said variable speed output device; and additional gearing means transmitting changes in angular position of the wind triangle rack to the output shaft side of the first differential mechanism.

13. In a recorder system for aircraft, a ground track tracer having wheels adapted to move over a chart or map, motive means for driving said wheels to trace said ground track, additional motive means for orienting said wheels, a triangulation device, means for supplying said device with data corresponding to the air speed and heading of said craft, means for supplying said device with further data corresponding to wind speed and direction, means controlled from said triangulation device for operating said first motive means in accordance with the resulting ground speed of said craft, and additional means controlled from said triangulation device for operating said additional motive means for orienting said wheels in accordance with the ground course of said craft.

14. A course recorder for aircraft comprising a recording element, motive means for driving said recording element to generate a trace, additional motive means for orienting said recording element, a triangulation device, means for supplying said triangulation device with data corresponding to the air speed and heading of said craft, means for supplying said triangulation device with data corresponding to wind speed and direction, means controlled from said triangulation device for operating said first motive means in accordance with the resulting ground speed of said craft and means controlled from said triangulation device for operating said additional motive means for orienting said element in accordance with the ground course of said craft.

15. In a recorder system for a machine, a ground track tracer having wheels adapted to move over a chart or map, motive means for driving said wheels to trace said ground track, additional motive means for orienting said wheels about their vertical axes, a triangulation device, means for supplying said device with data corresponding to the air speed and heading of a craft, means for supplying said device with further data corresponding to wind speed and direction, means controlled from said triangulation device for operating said first motive means in accordance with the resulting ground speed of said craft, and additional means controlled from said triangulation device for operating said additional motive means for orienting said wheels in accordance with the ground course of said craft.

16. An aviation training apparatus comprising, in combination, a grounded trainer having a seat for a student, means in said trainer simulating the rudder pedals and throttle control of a real plane, a flight simulating device connected to said trainer and adapted for movement with respect to a fixed surface, and means including a mechanical triangle connected to the flight simulating device for controlling the speed and direction of travel thereof, said mechanical triangle being connected to said rudder pedals and throttle lever so as to be responsive to movements thereof, and additional input means connected to said mechanical triangle for introducing thereto the factors of assumed wind speed and direction.

GUNNE LOWKRANTZ.
KARL A. KAIL.

REFERENCES CITED

The following references are of record in the file of this patent:

UNITED STATES PATENTS

| Number | Name | Date |
|---|---|---|
| 1,123,795 | Pollen | Jan. 5, 1915 |
| 1,784,929 | Estoppey | Dec. 16, 1930 |
| 1,802,963 | Young | Apr. 28, 1931 |
| 1,910,093 | Colvin | May 23, 1933 |
| 2,099,857 | Link | Nov. 23, 1937 |
| 2,116,508 | Colvin | May 10, 1938 |
| 2,119,083 | Link | May 31, 1938 |
| 2,164,412 | Koster | July 4, 1939 |
| 2,179,663 | Link | Nov. 14, 1939 |
| 2,332,475 | Sorensen | Oct. 19, 1943 |
| 2,386,555 | Hughes | Oct. 9, 1945 |